United States Patent Office 3,435,675
Patented Apr. 1, 1969

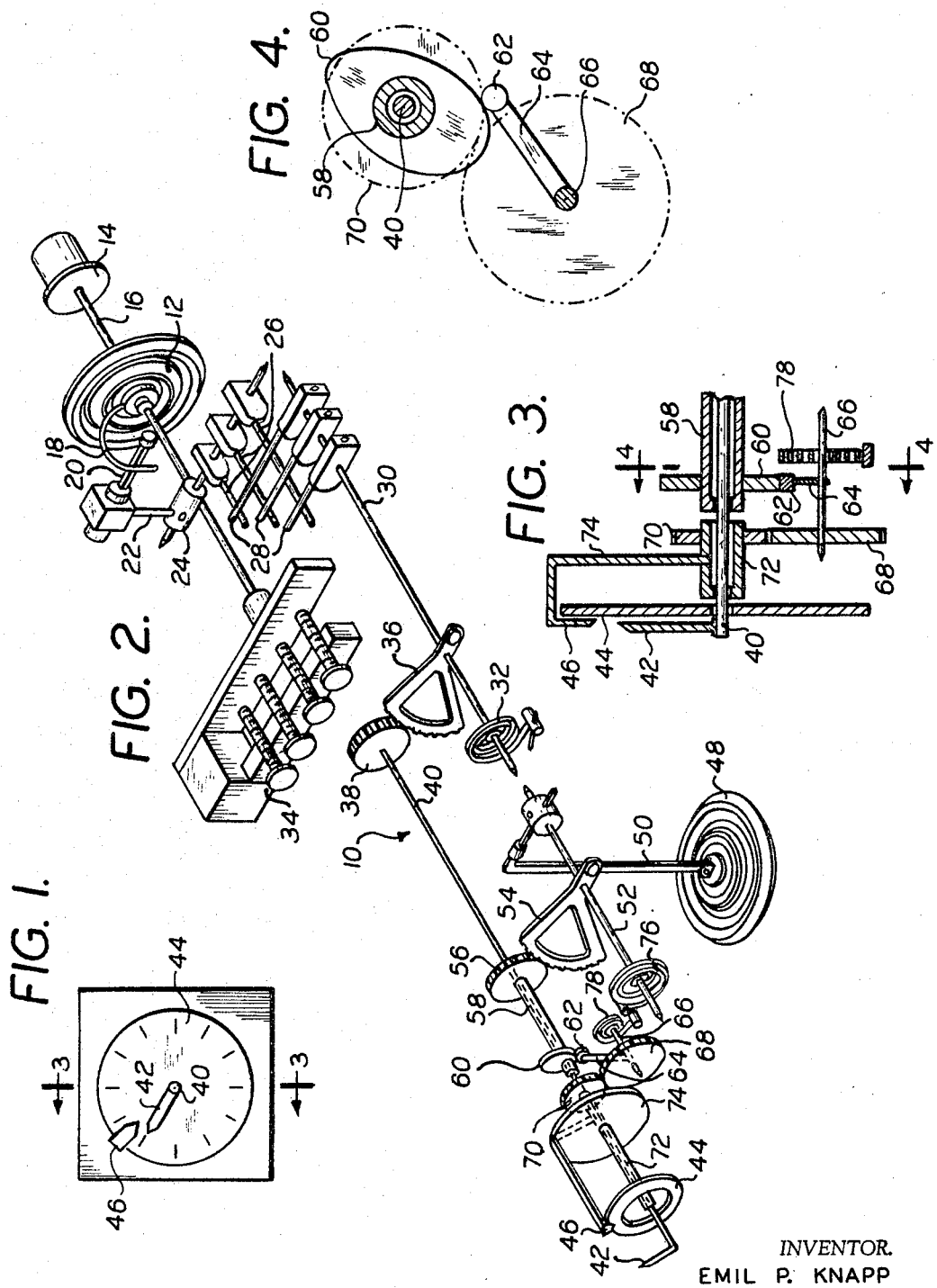

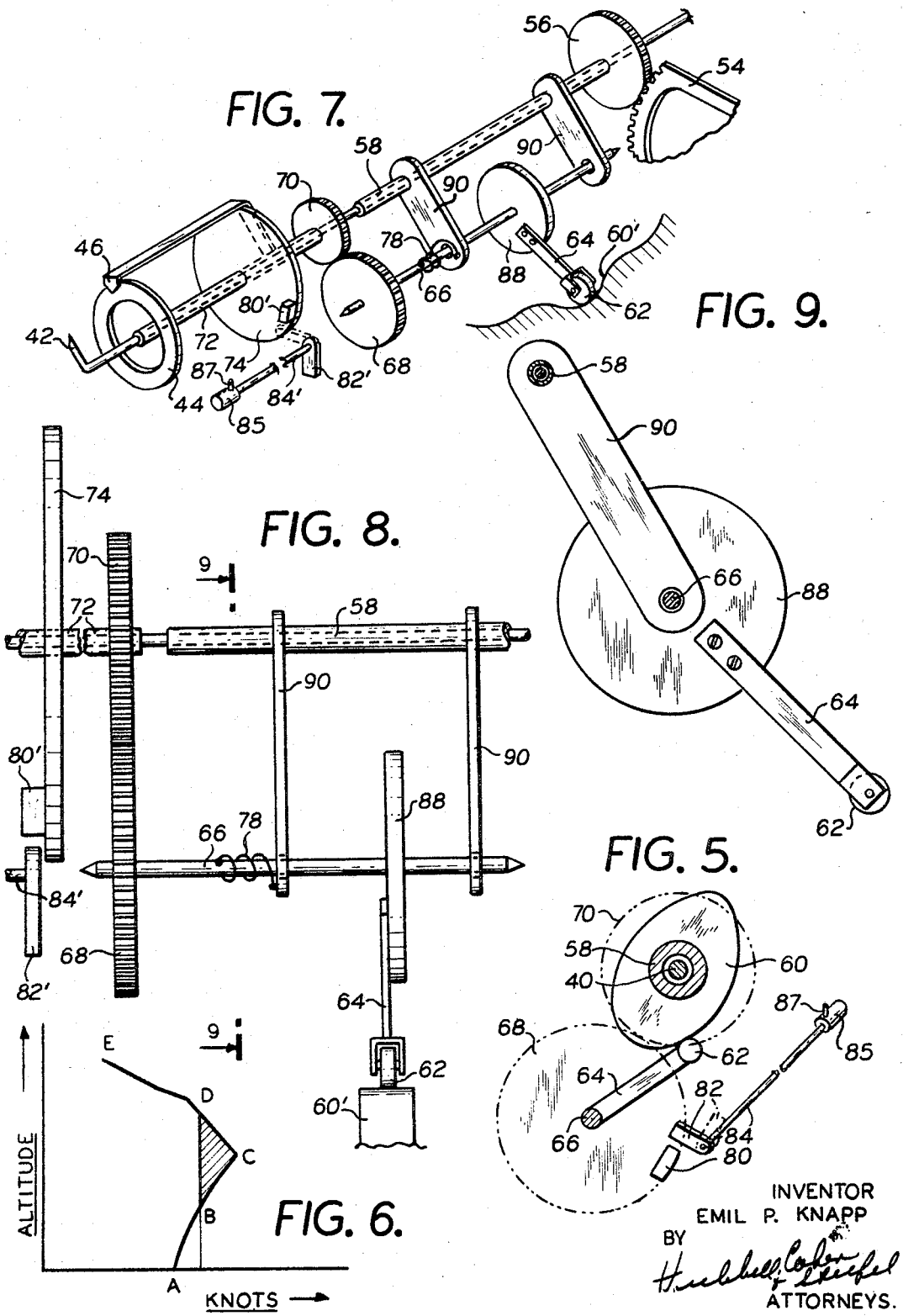

3,435,675
MAXIMUM ALLOWABLE AIRSPEED POINTER
Emil P. Knapp, Floral Park, N.Y., assignor, by mesne assignments, to Lear Siegler, Inc., Santa Monica, Calif., a corporation of Delaware
Filed Nov. 29, 1966, Ser. No. 603,079
Int. Cl. G01c 21/00
U.S. Cl. 73—182          10 Claims

ABSTRACT OF THE DISCLOSURE

Maximum allowable airspeed indicating device wherein maximum allowable airspeed pointer is driven in response to changes in external parameter such as altitude by drive means operably associated with means for sensing changes in said external parameter, the drive means including cam means for rotating the maximum allowable airspeed pointer as a function of change in the parameter and of shape of cam. By tailoring the shape of cam to specific characteristics of aircraft, accurate maximum allowable airspeed reading is provided over the entire range of flight. The device may include means for deactuating the cam means where a change in use of aircraft results in a portion of the maximum allowable airspeed curve being constant value.

---

In flying, it is essential for the safety of both the pilot and the aircraft that the safe maximum airspeed of the particular aircraft not be exceeded. In airspeed indicators and combination mach and airspeed indicators, it is customary to include a pointer which indicates the maximum safe airspeed for the aircraft. This pointer may be stationary or it may move as a function of some parameter, generally altitude.

In many types of aircraft, the maximum allowable airspeed is a function of mach number and indicated or equivalent airspeed. At higher altitudes, on some aircraft the maximum allowable airspeed may be a function of different mach numbers. As is known, the airspeed for a given mach number varies non-linearly with altitude. Each aircraft has its own typical maximum allowable airspeed characteristic. Moreover, the maximum allowable airspeed characteristics of some aircraft will change upon a transformation in use, as from passenger to cargo service.

In order to provide maximum efficiency of flight and to allow pilots to fly at or near the maximum safe airspeed at any altitude, it is most desirable to provide on an airspeed instrument or on a combined airspeed and mach indicator a pointer which indicates the actual maximum allowable airspeed at any altitude in flight and not merely an arbitrary fixed maximum allowable airspeed. Because of the non-linear nature of the maximum airspeed as a function of altitude, means must be provided to non-linearly translate changes in altitude to maximum allowable airspeed readings. Also, because this non-linear variation is different for different types of aircraft, it is necessary to provide different means for each such aircraft.

Heretofore, the known mechanical means for obtaining these desired results consisted of relatively complicated structures as, for example, crank and lever assemblies. The use of such prior known assemblies or structures for imparting a non-linear movement to a maximum airspeed pointer involved relative difficulty in fabrication and assembly, costliness of manufacture, and difficulty, if not impossibility, of adjustment once the assemblies were installed in the instrument. In addition, because of the varying characteristics of different aircraft, an entirely separate instrument had to be constructed for each type of aircraft in order to provide an accurate relationship between the maximum allowable airspeed of that particular aircraft and its altitude.

A more detailed discussion of the variation of maximum allowable airspeed with altitude is not deemed necessary to an understanding of this invention. However, such a discussion, as well as a description of other means for indicating maximum allowable airspeed, may be found in U.S. Patent 3,205,708 granted September 14, 1965, to John H. Andresen and assigned to the assignee hereof.

It is an object of this invention to provide novel means for imparting to the maximum allowable airspeed pointer of an airspeed indicator or combined airspeed and mach indicator a smooth movement which is a non-linear function of its motive means movement and which movement can be readily adjusted.

Another object is to provide an airspeed instrument with an improved drive means for imparting a non-linear movement to the max. allowable airspeed pointer which is in accordance with the change in maximum allowable airspeed for a given change in an external parameter, e.g., the altitude, for the aircraft in which the instrument is mounted.

Another object is the provision of means for providing a pilot of an aircraft with the max. allowable airspeed reading at any altitude in flight, which means can be readily and inexpensively adapted for use in a wide variety of aircraft having varying maximum allowable airspeed characteristics.

Yet another object is to provide a max. allowable airspeed indicator which is simple in construction, inexpensive to fabricate, positive in operation, and adaptable for incorporation in modern airspeed and combined airspeed and Mach indicator instruments.

Still another object is to provide a max. allowable airspeed indicator which includes means for adapting to a change in max. allowable airspeed characteristics of the aircraft in which it is mounted, which change is occasioned by converting said aircraft from passenger to cargo use or vice versa.

The above objects and other features and advantages of this invention are obtained by a construction which essentially comprises a maximum allowable airspeed pointer operatively associated with a standard airspeed dial of an airspeed instrument or a combined airspeed and mach indicator, an external parameter sensing means, e.g., an altitude capsule, mechanically connected to the pointer to effect movements in the pointer corresponding to pressure changes in the capsule caused by changes in altitude, and cam means interposed in the connecting means and shaped to yield a non-linear movement of the pointer with change in altitude, which movement along the airspeed dial corresponds to change in maximum allowable airspeed for the particular aircraft. In order to adapt the instrument for use in a different type of aircraft, all that must be done is to change cams and insert a new cam which is contoured to reflect the maximum allowable airspeed curve for the new aircraft.

In accordance with a preferred feature of the invention, stop means are provided for selectively limiting the movement of the cam follower over a given portion of the cam for those aircraft wherein conversion of the aircraft from passenger to cargo use results in a change in a portion only of the maximum allowable airspeed characteristics, which change is a reduction of maximum allowable airspeed to a (lower) constant value over the altitude range corresponding to greatest maximum allowable airspeed during passenger use. As used herein, in the specification and the claims affixed thereto, the term "cam" means any standard cam known in the art which includes a shaped portion having a follower in engagement therewith, and is not intended to include linkages or crank and lever assemblies as exemplified by the crank and lever assembly 26–28 of FIG. 2 described hereinafter.

The above and other objects, characteristics, and features of the present invention will be more fully understood from the following description taken in connection with the accompanying illustrative drawings.

In the drawings:

FIG. 1 is a front elevational view of the dial of an airspeed instrument embodying the present invention and showing the airspeed pointer and the max. allowable airspeed pointer;

FIG. 2 is a perspective view of the mechanism of the airspeed instrument of FIG. 1;

FIG. 3 is a sectional view taken along the line 3—3 of FIG. 1;

FIG. 4 is a sectional view taken along the line 4—4 of FIG. 3;

FIG. 5 is a sectional view similar to FIG. 4 showing a modified form of the invention;

FIG. 6 is a graph illustrating a typical max. allowable airspeed curve for certain aircraft which exhibit a particular type of variation of said curve upon conversion of the aircraft from passenger to cargo use;

FIG. 7 is a perspective view of the mechanism of an airspeed instrument showing another modified form of the invention;

FIG. 8 is a transverse sectional view of a portion of the mechanism shown in FIG. 7; and FIG. 9 is a sectional view taken along the line 9—9 of FIG. 8.

Referring now to FIGS. 1–4 of the drawings in detail, the airspeed instrument is designated generally by the reference numeral 10. It will be understood that the device of the invention can be incorporated in a more complex instrument such as a combined airspeed and mach indicator without departing from the invention. However, for simplicity of presentation, the invention is described in connection with an airspeed indicator, without any intention of thereby limiting the scope of the protection sought or granted herein.

The airspeed instrument 10 includes an airspeed capsule 12 which is connected to a pitot pressure source 14 by a pipe or conduit 16. As the capsule 12 expands and contracts, a U-shaped output member 18 moves back and fourth in the direction of the longitudinal axis of the instrument 10. The number 18 is in engagement with an arm 20 which extends outwardly from a rod 22 fixed to a rotatable shaft 24, which is journaled in end bearings that are not shown. Extending radially from the shaft 24 are one more levers 26 which are in cooperative engagement with one or more levers 28 which are secured to a rotatable shaft 30. The shaft 30 is rotatably journaled in end bearings (not shown) and is biased by a spring 32 in a counterclockwise direction whereby to bias the arm 20 into a continuous operative engagement with the member 18. Accordingly, as the member 18 moves back and forth, the shaft 24 will rock about its axis. The interconnecting levers 26 and 28 form no part of the present invention per se and any other form of interconnecting linkage may be employed in the present invention. The specific nature of the interconnecting linkage 26 and 28 is more fully described in U.S. Patent 3,257,845 granted on June 28, 1966, to John H. Andresen, Jr., and Emil P. Knapp and assigned to the assignee hereof. It will also be noted that preferably associated with the capsule 12 is a calibrating means 34 which forms no part of the present invention and which may be deleted if desired. However, if a full explanation of the calibrating means 34 is desired, reference may be had to the aforementioned Patent No. 3,257,845.

Fixed to shaft 30 is a gear segment 36 which is in meshed relation with a gear 38 mounted on a shaft 40 to which an airspeed pointer 42 is also secured. The airspeed pointer is disposed in operative relation with an indicia bearing plate 44 which carries airspeed indicia thereon. It will be obvious that as the airspeed of the aircraft varies, the pressure in capsule 12 will vary to cause an expansion and contraction of the capsule 12 which expansion and contraction will cause in turn a longitudinal movement of member 18 which movement will cause rocking movement of the shaft 24 and, through the levers 26–28, there will be a rocking movement of the shaft 30, which rocking movement will be translated by the gear 36 and the gear 38 into rotational movement of the shaft 40 and the airspeed pointer 42. As the airspeed pointer moves, it will point to different airspeed indicia on the indicia plate 44 whereby to indicate a changed airspeed.

Also associated with the indicia plate 44 is a maximum allowable airspeed pointer 46. In accordance with this invention, pointer 46 is connected to a conventional static pressure capsule 48 in such manner that movements of the capsule caused by pressure changes due to changes in altitude are translated by a corresponding movement of the pointer to indicate the maximum allowable airspeed of the aircraft at the changed altitude.

In the embodiment illustrated in FIGS. 2–4, this connection comprises a vertical crank 50 connected to the capsule 48, crank 50 being linked by conventional means to a horizontal shaft 52 which is rotatably journaled in bearings which are not shown. Mounted on shaft 52 is a segmented gear 54 which is in meshed relationship with an associated gear 56. Gear 56 is mounted on a sleeve 58 which is coaxial with shaft 40 and which carries thereon a cam 60. As explained above, the cam 60 is shaped to reflect the maximum allowable airspeed characteristics of the aircraft on which the instrument is mounted.

Associated with cam 60 is a cam follower 62 which is biased against the cam surface by a spring 78 as will be seen hereinafter. Cam follower 62 is mounted on a crank 64 which is in turn connected to a shaft 66 which is offset from and parallel to shaft 40 and sleeve 58. Shaft 66 has mounted thereon a gear 68 which is in meshed relationship with a gear 70 mounted on a separate sleeve 72 which sleeve 72, like sleeve 58, is coaxial with shaft 40 and has mounted thereon a disc 74. The maximum allowable airspeed pointer 46 is fixed to the periphery of disc 74. The spring 78 biases shaft 66 counterclockwise to therefore bias the cam follower into engagement with cam 60.

An anti-backlash spring 76 is provided on shaft 52 to normally urge shaft 52 in a clockwise direction, thereby eliminating any backlash from the shaft 52 to the altitude capsule 48.

In operation, a change in altitude of the aircraft would set in motion a corresponding change in position of the maximum allowable airspeed pointer 46 as described below with particular reference to FIG. 2. Assuming the altitude is increased, the corresponding drop in static pressure will cause an expansion of the static pressure capsule 48, which expansion will in turn cause an upward movement of the crank 50. This upward movement of crank 50 will cause a clockwise rotation of shaft 52 which will in turn be translated, through gears 54 and 56, into a counterclockwise rotation of shaft 58 and cam 60 mounted thereon. The rotation of cam 60 will cause a displacement of cam follower 62, the amount and direction of which will depend on the particular configuration of the cam surface at that portion of the cam on which the cam follower 62 is resting. As explained, this configuration depends on the maximum allowable airspeed characteristics of the aircraft. The displacement of cam follower 62 will, in turn, be translated into a corresponding displacement of maximum allowable airspeed pointer 46 as described in detail below. If the rotation of cam 60 results in an increase in the radius thereof at the point of contact with cam follower 62 then cam follower 62 will be displaced in a clockwise direction, whereas if the radius is decreased, the displacement of cam follower 62 will be in a counterclockwise direction. Of course, if the characteristics of the aircraft are such that the particular change in altitude results in no change in max. allowable airspeed, the cam 60 will be so contoured that there will be no resulting change in its radius upon the rotation thereof brought about by the particular change in altitude in the manner hereinabove described. Consequently, cam follower 62 will not be displaced in either direction. Assuming that the characteristics of the aircraft at its altitude are such that a particular increase in altitude results in an increase in maximum allowable airspeed, cam 60 will be so contoured that the rotation of shaft 58 will result in a decrease in the radius of cam 60 at the point of contact thereof with cam follower 62. The cam follower will therefore be displaced in a counterclockwise direction, which displacement will be translated through crank 64 to a counterclockwise rotation of shaft 66 and gear 68 mounted thereon. This in turn, will result in a clockwise rotation of gear 70, sleeve 72 and disc 74, thus causing a corresponding clockwise rotation of maximum allowable airspeed pointer 46 to thereby indicate a higher maximum allowable airspeed on indicia plate 44. Of course, if the aircraft characteristic at said altitude called for a reduction in maximum allowable airspeed for said increase in altitude, then the radius of the cam 60 at the point of contact with cam follower 62 would increase to yield the necessary indication of decreased maximum allowable airspeed.

A modified form of the invention applicable to aircraft exhibiting a particular kind of variation of max. allowable airspeed upon conversion from passenger to cargo service is illustrated in FIGS. 5 and 6. Referring to FIG. 6, curve ABCDE is a typical max. allowable airspeed curve for certain aircraft, such as the DC8F, when used in passenger service. When such aircraft are converted to cargo service, the max. allowable airspeed characteristic curve is changed, the new curve being illustrated by curve ABDE. It will be noted that the two curves differ only in the essentially straight line portion BD of the curve for the cargo service, corresponding to a lower max. allowable airspeed for the altitudes between points B and D when the aircraft is used in cargo service.

As will be appreciated from the description of the invention in connection with FIGS. 1–4, the radius of cam 60 at its point of contact with cam follower 62 decreases as max. allowable airspeed increases. Accordingly, it becomes possible to provide for the change in max. allowable airspeed characteristics which occurs upon conversion from passenger to cargo service of aircraft exhibiting max. allowable airspeed characteristics of the type illustrated in FIG. 6. This can be accomplished by providing means for preventing the cam follower 62, during cargo service, from contacting the surface of cam 60 during altitudes in flight between points B and D of FIG. 6. That is, by restraining the cam follower at point B when the corresponding altitude is reached, contact with the surface of cam 60 is prevented until an altitude corresponding to point D is reached inasmuch as the radius of the cam 60 is tailored to correspond to portion BCD of the curve for passenger service and is therefore less than the radius for the portions AB or DE in order to reflect the greater max. allowable airspeed during passenger service for the altitudes between points B and D.

This conversion from passenger to cargo service is accomplished in accordance with the modified form of the invention illustrated in FIG. 5 by movable stop means for selectively preventing cam follower 62 from contacting that portion of the surface of cam 60 corresponding to curve BCD when the aircraft is in cargo service. In the illustrated embodiment, the stop means comprises a boss 80 mounted on gear 68, a finger 82 movable between a cargo service stop position illustrated by the solid line position in FIG. 5 and a passenger service release position illustrated by the dotted line position in FIG. 5, and means for moving finger 82 into and out of stopping relation with boss 80, such as, for example, turning means 84 for pivoting said finger 82 between said stop and release positions. As shown, turning means 84 is a rotatable shaft on which finger 82 is fixed. Preferably, shaft 84 extends through the front of the instrument and has a control knob 85 fixed thereto for turning shaft 84 and finger 82. A pointer 87 may be fixed to knob 85 or shaft 84 to cooperate with indicia (not shown) on the front of the instrument casing to indicate whether the stop means is in its passenger position (retracted) or in its cargo position (extended).

In operation, when the aircraft is used in passenger service, the control knob 85 will be set in the passenger position and the finger 82 will be in the dotted line or retracted position, thus permitting the cam follower to be biased against the cam during the entire flight of the aircraft. Upon conversion of the aircraft to cargo service, the control knob is moved to the cargo position, thereby effecting movement of the finger 82 to the solid line stop position by rotation of shaft 84. With finger 82 in the stop position, the cam follower 62 will be permitted to ride on the cam surface in the same manner as when the aircraft is in passenger service until the altitude represented on FIG. 6 by point B is reached, at which point finger 82 will contact boss 80 to thereby prevent further counterclockwise rotation of gear 68, and consequently of the connected elements, shaft 66, crank 64 and cam follower 62. Between altitudes B and D the radius of cam 60 will be less than that necesary for the cam surface to contact the now restrained cam follower 62. Accordingly, gear 68 will remain stationary during that portion of the flight and there will be no change in the indicated max. allowable airspeed (see FIG. 2). At altitude D, the radius of the cam 60 will be just sufficient for the surface of cam 60 to contact cam follower 62. As the altitude increases from point D to point E, the radius of cam 60 will increase to reflect the decrease in max. allowable airspeed, which max. allowable airspeed at altitudes above point D is again identical for both passenger and cargo service. The increased diameter of the cam 60 at the point of contact with cam follower 62 will cause a clockwise rotation of cam follower 62 to in turn cause an indication of the reduced max. allowable airspeed as heretofore described in connection with FIGS. 1–4. It will be observed that neither the movement of cam follower 62 between altitudes D and E nor the movement of cam follower 62 between altitudes A and B will be affected by the above described stop means, so that said stop means can be set in the cargo or stop position during the entire time that the aircraft is in cargo service and the max. allowable airspeed will be accurately indicated during the entire flight of the aircraft.

Another modified form of the invention is illustrated in FIGS. 7–9 wherein similar parts are given similar reference numerals to those used in FIGS. 1–5. Essentially this modification involves the substitution of a stationary cam 60′ for the rotating cam 60 of the embodiment of FIGS. 1–4. Stationary cam 60′ may be mounted in any convenient position on the device so long as cam follower 62 can be conveniently biased against the surface thereof.

Referring to FIGS. 7–9 of the drawings, sleeve 58 is similar to sleeve 58 of the embodiment of FIGS. 1–4, being rotatable in response to changes in the static pressure capsule 48 (see FIG. 2) by means of meshing gears 54 and 56, gear 56 being mounted on sleeve 58 and gear 54 being connected to static pressure capsule 48 as illustrated in FIG. 2. Mounted on sleeve 58 is the upper end of each of a pair of straps 90. The opposite ends of straps 90 have a cut-out portion (of slightly greater diameter than shaft 66) in which shaft 66 is rotatably mounted. On one end of shaft 66 is a gear 68 which is intermeshed with gear 70 on sleeve 72 for rotating max. allowable airspeed pointer 46 in the same manner as in the illustration of FIG. 2.

Also mounted on shaft 66 is a disc 88 on which is mounted crank 64 which in turn carries cam follower 62 mounted thereon. It will, of course, be understood that disc 88 is not essential and that crank 64 could be directly mounted on shaft 66 as in FIG. 2.

Spring 78 is mounted on a strap 90 to bias shaft 66 clockwise to thereby bias cam follower 62 into engagement with the stationary cam 60'.

In operation, a change of altitude will be translated into a rotation of sleeve 58 through gears 54 and 56 as described in detail in connection with the embodiment of FIGS. 1–5. The rotation of shaft 58 will cause a displacement of strap 90 which will in turn cause an angular displacement of shaft 66 and hence a rotation of gear 68 relative to gear 70. In addition, the displacement of shaft 66 will cause cam follower 62 to ride over a portion of the surface of cam 60' whereupon a change in the radius of said cam will result in a rotation of cam follower 62 and a corresponding rotation of shaft 66 and gear 68.

It will thus be seen that the rotation imparted to gear 70 by gear 68 which results in a corresponding movement of max. allowable airspeed pointer 46 is dependent upon both the rotation of shaft 58, which is in turn dependent on the change in altitude, and the shape of cam 60 which is contoured to reflect max. allowable airspeed for the particular altitude attained. Thus, if a particular change in altitude is not accompanied by any change in max. allowable airspeed, cam 60' will be contoured to just offset the rotation imparted to gear 68 due to the rotation of sleeve 58. That is, since any change in altitude will result in rotation of gear 68 due to the resulting angular displacement of shaft 66, when the max. allowable airspeed curve is such that a given change in altitude does not result in a change in max. allowable airspeed, the cam 60' must be contoured to simultaneously impart an exactly opposite rotation to gear 68 by proper rotation of cam follower 62 and thus of shaft 66 in order to avoid undesired movement of max. allowable airspeed pointer 46.

Stop means for conversion from passenger to cargo service in a manner analogous to that discussed above in connection with FIGS. 5 and 6 may optionally be provided. Referring to FIGS. 7 and 8, such stop means is illustrated comprising a boss 80' mounted on disc 74, a finger 82' rotatable between a dotted line stop position and a solid line release position, and a rotatable shaft 84' attached to said finger 82' and connected to a control knob 85 on the instrument panel for selectively positioning finger 82' in its desired position in the same manner as in the embodiment of FIG. 5.

In operation, when the stop means is employed during cargo service, finger 82' will be turned to the dotted line position illustrated in FIG. 7 and will engage boss 80' when point B (see FIG. 6) is reached in flight. Further clockwise rotation of disc 74 will thus be prevented. Since max. allowable airspeed pointer 46 is mounted on disc 74, further clockwise rotation of the pointer 74 will also be prevented, thus maintaining the max. allowable airspeed designation constant over the altitude between points B and D.

Inasmuch as disc 74 and gear 70 are both mounted on sleeve 72, gear 70 will likewise be restrained from further clockwise rotation. Thus, the counterclockwise rotation imparted to gear 68 by increases in altitude between points B and D will result in gear 68 merely "walking" around gear 70 and in cam follower 62 consequently being disengaged from contact with the surface of cam 60'.

It will be evident from the foregoing description of the present invention that after an aircraft has been developed and its maximum airspeed characteristic has been determined, a properly shaped cam can be readily constructed for that aircraft for use in the max. airspeed device of the present invention. It will also be appreciated that a particularly advantageous feature of the present invention is that the same basic device can be constructed for use in all kinds of aircraft; only the cam, which can, of course, easily be made interchangeable, need be separately specifically tailored for each individual type of aircraft.

While the present invention has been described above in combination with a simple airspeed indicator, as already noted it is equally adaptable for use in a combined airspeed and mach indicator. In such cases the pointer may be positioned so as to show maximum allowable airspeed either in knots alone, or in mach alone or simultaneously in knots and mach, depending on the type of instrument used. Moreover, the mach subdial can be fixed to shaft 58 so that the single altitude capsule 48 can drive both the mach subdial and the pointer 46.

In addition, while the description has been with reference to a moving pointer and a stationary dial, it is obvious that a dial face could be rotated by the mechanical linkage from the static pressure capsule relative to a stationary pointer or other indicia means.

While I have herein shown and described the preferred form of the present invention and have suggested modifications therein, other modifications may be made therein within the scope of the appended claims without departing from the spirit and scope of this invention.

What I claim is:

1. A device for continually indicating maximum allowable airspeed for an aircraft having a maximum allowable airspeed characteristic which varies as a function of an external parameter, said device comprising
    a dial face having indicia thereon;
    a maximum allowable airspeed pointer adapted to move relative to said dial face;
    external parameter sensing means; and
    motive means connecting said sensing means with said pointer for moving said pointer in response to a change in said external parameter to indicate the maximum allowable airspeed for said aircraft at said changed parameter, said motive means comprising
    a first shaft connected to said sensing means and rotatable in response to a change in a condition of said sensing means;
    a second rotatable shaft;
    means connecting said pointer to said second shaft for concomitant rotation therewith; and
    power train means for drivingly connecting said first shaft to said second shaft for rotating the latter in response to rotation of the former, said last mentioned means comprising a cam, a cam follower, and means for biasing said cam follower into engagement with said cam, said cam being shaped in accordance with the relationship between maximum allowable airspeed and said external parameter,
    whereby said pointer is positioned relative to said indicia on said dial face in accordance with said external parameter to thereby indicate the maximum allowable airspeed.

2. The device of claim 1 wherein said parameter is altitude and said sensing means is altitude sensing means.

3. The device of claim 2 wherein said altitude sensing means is a static pressure capsule.

4. The device of claim 2 which is incorporated in an airspeed indicator, said dial face being the dial face of said airspeed indicator.

5. The device of claim 4 wherein said airspeed indicator includes an airspeed pointer, airspeed sensing means and means connecting said airspeed pointer to said airspeed sensing means for moving said airspeed pointer relative to said dial face in response to changes in airspeed, said connecting means includes an airspeed shaft, and said first and second shafts are mounted on and coaxial with said airspeed shaft.

6. The device of claim 1 wherein said cam is a disc cam mounted on said first shaft for rotation therewith and said cam follower rotates in response to rotation of said cam, said device further including means connecting said cam follower to said second shaft for rotating said second shaft in response to rotation of said cam follower.

7. The device of claim 6 wherein said last mentioned means comprises a third shaft parallel to said first shaft, said cam follower being fixed to said third shaft.

8. The device of claim 7 further including stop means movable between an operating and a non-operating position, said stop means preventing engagement of said cam follower with a portion of said cam surface in said operating position.

9. The device of claim 1 wherein said cam is a fixed cam, said device further including a third shaft and a strap having a first and second end, said cam follower being connected to said third shaft, said first end of said strap being mounted on said first shaft for rotation therewith, and said third shaft being rotatably mounted on said second end of said strap.

10. The device of claim 9 further including stop means movable between an operating and a non-operating position, said stop means preventing engagement of said cam follower with a portion of said cam surface in said operating position.

References Cited

UNITED STATES PATENTS

| | | | |
|---|---|---|---|
| 2,869,365 | 1/1959 | Anastasia | 73—181 |
| 3,154,944 | 11/1964 | Johanson | 73—182 |
| 3,205,708 | 9/1965 | Andresen | 73—182 |

OTHER REFERENCES

Flight, "Sonic Speed Warnings," pp. 579–580, 585, June 19, 1947.

LOUIS R. PRINCE, *Primary Examiner.*

D. E. CORR, *Assistant Examiner.*